Figure 1:
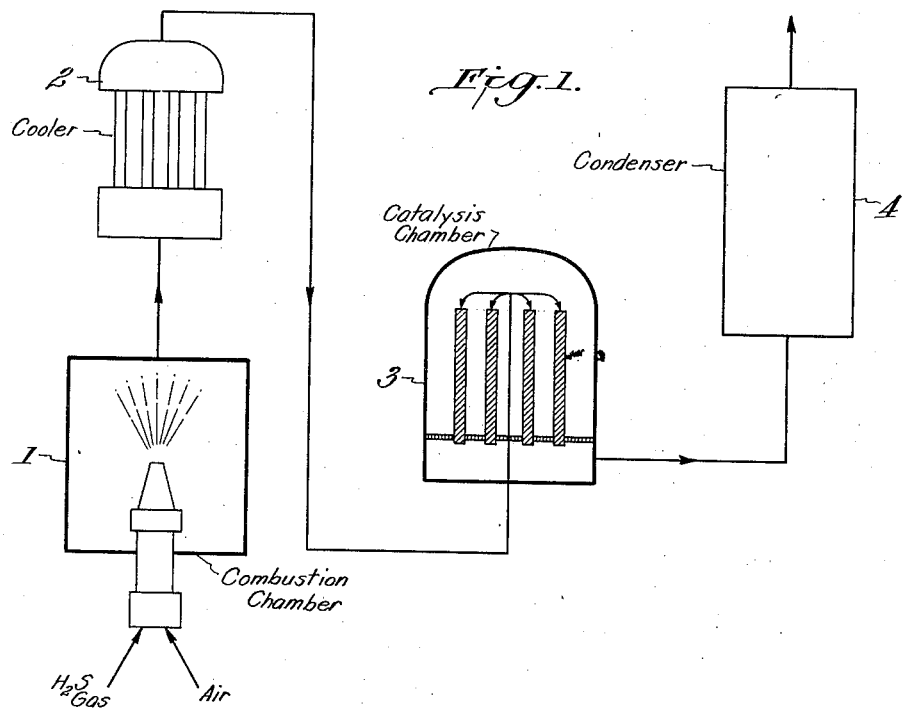

Sept. 12, 1939.    C. T. D. KOOLMAN ET AL    2,172,617
PROCESS FOR THE PRODUCTION OF SULPHURIC ACID
Filed Dec. 14, 1932

Inventors:
Carl ten Doornkaat Koolman,
Wolfhart Siecke,
Max Wohlwill,
By Potter, Pierce & Scheffler
Attorneys.

Patented Sept. 12, 1939

2,172,617

UNITED STATES PATENT OFFICE 2,172,617

PROCESS FOR THE PRODUCTION OF SULPHURIC ACID

Carl ten Doornkaat Koolman, Wolfhart Siecke, and Max Wohlwill, Frankfort-on-the-Main, Germany, assignors to American Lurgi Corporation, New York, N. Y., a corporation of New York Application December 14, 1932, Serial No. 647,270
In Germany December 18, 1931

4 Claims. (Cl. 23—175)

This invention relates to a process for the production of sulphuric acid, in which $SO_2$ is converted into $SO_3$ in presence of contact masses, in association with air or other oxygen-bearing gases and at least a sufficient amount of water, in the state of vapour, to form concentrated sulphuric acid.

The method hitherto generally adopted for the production of sulphuric acid by the contact process consisted in first subjecting the gases (e. g., from roasting furnaces or the like) containing $SO_2$ to a careful purification by means of dust separators and washers, then drying the gases in drying towers and passing them into the contact apparatus, for effecting the conversion of $SO_2$ to $SO_3$. The gases issuing from the contact apparatus are thereupon cooled by heat exchange with fresh gas, and are then freed from sulphuric anhydride by absorption in concentrated sulphuric acid.

Moreover, it has already been ascertained that certain of the catalysts employed in the production of sulphuric acid are insensitive to water, and it has therefore been proposed, in working with roasting-furnace gases, to dispense with the preliminary drying of the gases and pass the gases, together with the naturally contained water due to atmospheric humidity, through the contact furnace.

The present invention, however, goes further than this proposal, inasmuch as the gases are led to the catalyst together with such a quantity of water vapour that sulphuric acid can be directly condensed during the subsequent cooling. This constitutes an extraordinary simplification in the production of sulphuric acid since, on the one hand, any pre-drying of the gases containing $SO_2$—even when their moisture content is high—can be dispensed with, and also because the existing practice of washing the gases with concentrated sulphuric acid is omitted. Actually, if certain quantities of moisture were present, such a washing process would produce a weak acid, whereas, on the other hand, the addition, according to the present invention, of a sufficient amount of water vapour to assure the direct condensation of sulphuric acid, renders special washing apparatus for absorption superfluous.

The invention has the further advantage that the heat disengaged by the combination of $SO_3$ and $H_2O$, and also by the condensation, can be utilised even for preheating gases that are relatively low in $SO_2$.

Hitherto, the gas concentration in the contact process amounted to about 5% by volume of $SO_2$, and over, because it was only by the attainment of this concentration that the amount of heat necessary for the process could be provided, an additional supply of heat, by warming up the gases prior to catalysis, being required in the case of lower concentrations. Whereas, according to the existing method of producing sulphuric acid, only the heat resulting from the reaction

$$SO_2 + O = SO_3 + 23 \text{ cal.}$$

was recovered, the heat liberated by the reactions

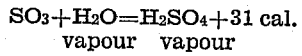
$$SO_3 + H_2O = H_2SO_4 + 31 \text{ cal.}$$
$$\text{vapour} \quad \text{vapour}$$

and

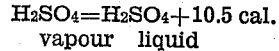
$$H_2SO_4 = H_2SO_4 + 10.5 \text{ cal.}$$
$$\text{vapour} \quad \text{liquid}$$

is also obtained in the process according to the invention. The total heat is therefore more than doubled, so that a correspondingly lower concentration of the gases entering is safely admissible from the thermotechnical point of view.

By means of the process according to the present invention it has been found possible to catalyse with a high degree of efficiency, even gases containing only about 2% by volume of $SO_2$, which have been charged with the corresponding amount of moisture and heated. In order to start the process the contact apparatus has to be warmed up for a short time at the outset.

The temperature in the contact apparatus is about 400–500° C.

This unanticipated favourable behaviour of the moist gases in the catalytic conversion in the foregoing experiment might be accounted for by the assumption that, at the temperatures employed in the contact apparatus, the $H_2SO_4$ undergoes extensive dissociation into $H_2O$ and $SO_3$, and that consequently $H_2SO_4$ capable of attacking the contact mass, is not present at said temperature. It is only after the gases have left the contact apparatus and are in course of further cooling, that $SO_3$ and $H_2O$ unite to form $H_2SO_4$, which is condensed while rigidly observing the conditions to be discussed in the following.

The catalysts employed for carrying out the process must be above all insensitive to water. This requirement is fulfilled by contact masses containing vanadium oxide. A catalyst consisting of vanadium oxide, precipitated silica and an alkali metal oxide, more particularly potassium oxide, has been found to have a very particularly favourable action. Apart from these, however, all other oxidic or mixed catalysts have proved to be capable of application, in which care is taken to ensure that the sulphation of the oxides is prevented by the addition of an acid, which is adapted to split up the sulphates at the temperatures prevailing during the catalysis.

Thus, for example, a mixture of an oxidic catalyst in which vanadium oxide is present in combination with an alkali or alkaline earth metal oxide and silica, titanic acid, germanium dioxide, stannic acid, phosphoric acid, tungstic acid or molybdenic acid is suitable. The oxides of elements of the iron group including manganese may also find employment instead of vanadium metal oxide. The best effect is, however, obtained with an alkali oxide-vanadium oxide catalyst on precipitated silica.

In the event of the $SO_2$ content of the gases being still lower—which may readily occur owing to the varying composition of industrial gases, or, for example, when very poor metallurgical gases are employed—the following point, additionally determined according to the invention, becomes important. This point consists in that the contact masses suitable for the present process (such as vanadium contact masses) are also insensitive towards the gaseous products of the combustion of heating agents. It follows, therefore, that the gases containing $SO_2$ can be directly heated, for example by means of the heating flame directed into the contact furnace.

The heating may be effected by burning combustible gases, oil, or the like, preference being given to fuels containing hydrogen, which furnish water on combustion and can therefore be advantageously employed for simultaneously furnishing the requisite moisture content in a simple manner.

The heating may also be performed by passing combustible gases in association with the gases containing $SO_2$, through the contact mass, their oxidation being effected in direct contact therewith. For example, the oxidation of the $SO_2$ can be combined with the combustion of CO, one molecule of which can replace about three molecules of $SO_2$ for the generation of heat. It follows, therefore, that in carrying out the process according to the invention with gases containing 2% by volume of $SO_2$ and 1% by volume of CO, the same effect can be obtained as with 5% by volume of $SO_2$ in the classical process, that is to say, the catalysis is performed in accordance with thermotechnical principles.

Indirect heating may, of course, be employed in place of direct heating by means of burners or the like, or by combustion in contact with the mass.

With regard to direct heating, it may be necessary when the combustion of the fuel is effected in the contact apparatus, to protect the mass against solid products of combustion, which may, naturally, injure the mass. With this object it is preferable to dispose, in front of the mass, a protective layer—for example of quartz—or to conduct the gases in such a manner that the solid particles are compelled to subside before the mass is reached.

In the process according to the invention, special attention should be given to the condensation of sulphuric acid.

Hitherto only a small amount of work has been done on the conditions obtaining when working with dilute gases, this work being, moreover, misleading in many cases, and leading to results which were useless in practice. Thus the experiments of Remy and Finnern (see Zeitschrift für anorganische und allgemeine Chemie 1927, vol. 159, page 241) showed that gases containing $SO_3$ were passed through boiling water and could only be absorbed by the precipitated water vapour after said gases had been charged with large quantities of said vapour. It is therefore only possible to obtain a very dilute acid by this process.

The investigations of Adadurow (see Journal für Chemische Industrie (Shurnal Chimitscheskoi Promyschlennosti) 8, Nr 18, 1–12, 1931) only explained the conditions which exist above the dew point of the concentrated sulphuric acid. In this connection Adadurow found that $SO_3$ and $H_2O$ must exist side by side in the temperature range of 450° C. down to 338° C. for a period of at least 3 to 6 seconds, in order to enable the gases to combine to form sulphuric acid in the form of vapour only. It is only on further cooling that complete condensation is possible, it being, however, expressly emphasised that the degree of concentration of the sulphuric acid recovered is dependent upon the total quantity of steam present.

Insofar as any mention is otherwise made of the condensation of the sulphuric acid in the presence of steam it is likewise stated that the degree of concentration depends on the quantity of steam added, so that it is also necessary to provide for cooling to the dew point of the water vapour as well.

In contradistinction to the view hitherto expressed it has transpired, according to the present invention, that the period during which the gases remain in the temperature range above 338° C. (the boiling point of sulphuric acid at 760 mm. pressure) is of no importance for the subsequent condensation. It may be perceived from the reversible equation $$SO_3 + H_2O \rightleftarrows \text{gaseous } H_2SO_4$$

that at a temperature of 338° C. in the dilute gases by no means all the $SO_3$ will be combined with water so that even with prolonged contact of the gases at a temperature above 338° C. certainly not all the $H_2SO_4$ will already be formed in the gaseous condition.

On the other hand, it has been ascertained to be an essential condition that the time of cooling shall not fall below a certain minimum just between the temperature of the dew point and about 140° C. to 150° C. It is of special importance that the rate of cooling should not fall below this extent at any point in the gas current. The effects are already very harmful if, for example, more rapid local cooling takes place at the walls of a condensation vessel than in the interior of said vessel, even though the average cooling time is kept greater than about 0.5 second. The upper temperature limit, that is, the dew point of the gases, does not, moreover, keep constant at 338° C., but depends rather both upon the concentration of $SO_3$ and of $H_2O$. In individual cases this temperature can be calculated with the aid of the physical constants.

Particular significance also attaches to another fact that has been ascertained, namely, that the lower temperature at which cooling of the gases during condensation occurs according to the principles set forth above must not be lower than 140° C. A considerable improvement is accordingly produced in the process hitherto proposed because on the one hand the apparatus required for cooling the gases can be limited to a considerable extent and in the second place an effect which is of still greater importance is that the condensation of highly concentrated sulphuric acid can be carried out even in the presence of an excess of steam.

The invention thus substantially consists in carrying out the actual condensation of sulphuric acid within a temperature range lying between the dew point of the gases down to about 140° C. and working at a sufficiently slow rate under these conditions. Only by the combination of these two features is a satisfactory solution reached of the problem of condensing sulphuric acid from gases in which the vapour pressure of $SO_3+H_2O$ is low.

The condensation itself is preferably carried out in condensing towers provided with fillers. It has already been stated that not inconsiderable quantities of heat are liberated both when $SO_3$ and $H_2O$ are brought together and also when vaporous $H_2SO_4$ is condensed to the liquid acid. Moreover the sensible heat of the moist gases must be led off. These quantities of heat must be dissipated during condensation, which is a matter of considerable difficulty when it is required to produce very large quantities of sulphuric acid. It is an obvious suggestion to conduct away the heat in a similar manner to that carried out in other condensing processes by means of direct and indirect cooling with water. This process failed completely, however, when applied to the condensing of sulphuric acid, since cooling carried out, for example, by spraying water during the critical temperature range produced a chilling effect. As a consequence thereof a mist of sulphuric acid was formed which could not be reconverted by any practical utilisable means into a liquid form capable of forming drops. It was therefore a question of conducting off the heat liberated with adequate care. Columns provided with fillers were just suited for this purpose because the fillers effected a thorough intermingling of the gases and prevented a too rapid rate of cooling at the walls of the towers.

It has, moreover, transpired that with higher velocities of flow the quantity of condensate produced per unit of cross-sectional area becomes greater. It is therefore advantageous to work with velocities of flow amounting to from about 0.8 to 1.2 metres per second.

Cooling in condensing columns of this type is advantageously effected by heat exchange through the walls with the surrounding atmosphere. Nevertheless in order not to have to construct condensing columns of excessive height, the condensation chambers are preferably constructed in the shape of long channels, which lie in a helical form around a cylinder. In this manner an annular tower is produced which is bathed internally and externally by atmospheric air, and which, even with a low height, offers a long condensation path and adequately slow fall of temperature.

Another method of carrying out the invention consists in subdividing the columns into a plurality of smaller columns in a manner similar to that of a heat exchanger, in order to produce larger cooling superficial area and low height even when using higher rates of flow.

Instead of effecting cooling by means of heat exchange through the walls of the tower with the surrounding atmosphere, another means of cooling may be employed by allowing small amounts of concentrated sulphuric acid to trickle down the column. This method of procedure has no connection with absorption, since the amounts of concentrated sulphuric acid employed are considerably smaller. It should, however, be borne in mind that the sulphuric acid has a high percentage strength, for example 80% strength, because any large quantities of water present would, on evaporating, cool the gases down locally too strongly.

The gases enter the condensing apparatus at a temperature corresponding approximately to the dew point of the mixture or lying somewhat above same. The condensation proper proceeds then at a temperature ranging downward to about 140° C.

Even in the presence of a considerable excess of steam, that is to say, a quantity of steam exceeding that necessary for forming $H_2SO_4$ from $SO_3$ it is possible to produce high percentage sulphuric acid by observing the conditions hereinbefore set forth.

If no excess of steam be added, then the gases in the column may also be allowed to cool down further without any more attention being then paid to the rate of cooling. If, on the other hand, an excess of steam be present, then on further cooling the gases in the column, the concentration of the acid produced can be controlled by the temperature of the issuing gases. An important novel recognition also lies in this fact, since hitherto it was only considered possible to regulate the concentration by controlling the quantities of steam present. It has been shown that when, for example, cooling the gases down to about 100° C. an 80% acid can still be obtained even when the excess of steam present would appear to indicate a substantially higher degree of dilution. It is, however, always important that the rate of cooling within the stated range of temperature shall not be kept too small.

It has proved to be of particular advantage to carry out the process in the condensing column in counterflow, that is to say, to introduce the gases at the bottom of the column and to allow them to issue at the top whilst the condensate formed drops down from the top to the bottom. The condensed sulphuric acid is drawn off at a temperature of about 280° C. with this method of working, concentrations of 90% and over being produced without difficulty by this means. Even working with co-current flow—during which the sulphuric acid is drawn off at a temperature of about 140° C. according to what has already been said—still gives good results, but in general does not allow such high acid concentrations to be obtained as when working in counter-current flow. When working in counter-current flow the concentration of the acid naturally depends upon the temperature at which the gases enter the bottom of the condensing tower, with the result that in no circumstances does an excess of water produce dilution of the acid flowing out at the bottom.

From the conditions set forth in the foregoing it is apparent that the sulphuric acid must be uniformly slowly cooled within the temperature range from the dew point down to about 140° C. The rate of cooling is therefore prolonged from the point of view of the condensation, under uniform cooling conditions when the dew point is raised. This can be effected by the presence of a considerable excess of steam. The invention therefore consists in improving the condensation by working in the presence of a considerable excess of steam, in support of which the following may be stated.

At temperatures above its boiling point of

330° C. monohydrate (H₂SO₄) undergoes, as is known, extensive decomposition into H₂O and SO₃ molecules. Assuming a concentration of about 5% by volume of SO₂ at 330° C. this dissociation of the sulphuric acid amounts to about 69% if the proportion of SO₃:H₂O is as 1:1. The equilibrium of the reversible reaction

depends, however, upon alteration in the H₂O component, so that as the H₂O proportion increases the sulphuric acid proportion increases. The equilibrium is then displaced to the left of the equation. On doubling the content of H₂O still assuming the presence of a 5% gas at 330° C. only 50% of the sulphuric acid vapour is dissociated. On increasing the proportion of H₂O to a treble excess only 39% of the sulphuric acid vapour is dissociated. By increasing the water content the incipient condensation of the sulphuric acid is displaced to a temperature range lying about 50° C. to 70° C. higher than that under normal conditions. At the instant when condensation of gaseous H₂SO₄ to liquid sulphuric acid commences, the proportions of the above equation are still further altered automatically with an excess of water in favour of the H₂O vapour and thus in favour of the formation of sulphuric acid vapour. If, for example, one starts with a gas in which the proportion of H₂O to SO₃ is as 2:1, and if 50% of the sulphuric acid be condensed to liquid, the proportion for the residual quantity of SO₃ in the gas is no longer 2:1, but is 3:1. This proportion is raised to a higher value as the condensation of the liquid sulphuric acid progresses.

The presence of an excess of steam does not exert a harmful influence upon the concentration of sulphuric acid formed, because the end of the condensation is apparently independent of the water content at temperatures of 140° C. to 150° C. At this temperature the vapour pressure of the sulphuric acid at the acid concentration occurring is so small that the loss in the waste gas is practically nil. It is therefore merely necessary to conduct away the waste gases from the condensation towers at this temperature in order to obtain a high acid concentration in the outflowing sulphuric acid.

The excess of water vapour is without harmful effect when working in counter-current, especially during fractional condensation, because in this case the concentration is determined by the temperature of the gases at the inlet end of the tower.

In order to produce an effective improvement in the condensation the proportion of water vapour to SO₂ should exceed 1.6:1 and may even be considerably greater than 2:1.

As is shown by the following examples, a larger amount of added water seems to indicate an improved reaction on the catalyst.

Raising the dew point may also be produced by working under increased pressure. It is true that it is known per se during catalysis of SO₂ to SO₃ to displace the equilibrium in favour of the SO₃ by increasing the pressure. In the presence of large quantities of steam increasing the pressure produces an improvement in the condensation conditions because the equilibrium in the reversible reaction

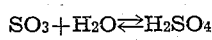

vapour is displaced in favour of the formation of H₂SO₄ vapour, by which means the partial pressure of the vaporous sulphuric acid is increased. The pressures to be employed can be maintained within the known limits, that is to say from about 1 to 10 atmospheres. From a practical point of view the present invention yields a whole series of the most diverse spheres of application. Thus, for example, industrial gases containing small or variable quantities of SO₂ which were hitherto allowed to escape into the atmosphere unused may now be utilised. The following examples illustrate more fully a series of the possibilities and the details of the embodiments under consideration in each case.

*Example 1*

Gases from a copper converter containing 5% by volume of SO₂ are freed from dust by washing with water at a temperature of 35° C. and then charged with a quantity of steam just sufficient for the formation of sulphuric acid. The gases are now brought to the necessary temperature for oxidation at about 450° C. in a heat exchanger, whereupon they pass into a contact chamber at this temperature. In said chamber the SO₂ is oxidised to SO₃ by means of a catalyst having a basis of silica and potassium-vanadium oxide. The hot gases from the contact chamber pass into the top of a vertical heat exchanger, cool down while flowing down through said heat exchanger to such an extent that they pass through the condensation tower which is provided with fillers at a temperature of 280° C. to 300° C. This condensation tower is of such a size that the gases cool down in it at a relatively slow rate, i. e., they are cooled down to about 150° C. in not less than about 1 second. The gases may be passed through this tower both in counter-current flow and also concurrently, 95% sulphuric acid being then drawn off at the lower end thereof. The yield of the process amounts to 96% calculated upon the sulphur charged in. When applied to copper converter gases the process of the present invention has the advantage of equalising out large variations occurring in the SO₂ concentration when working up copper matte, for example in the converter. The presence of moisture imparts to the heat exchanger such a reserve of heat that even if very poor gases are used or in the event of the SO₂ supply failing, a continuous re-heating effect is assured.

*Example 2*

Waste gases from a zinc roasting process carried out in a Dwight-Lloyd apparatus and containing about 5% by volume of SO₂ are washed at a temperature of about 35° C. so that they still contain about 5 to 6% by volume of water vapour. The gases thus freed from dust are heated directly to 450° C. by the combustion of blast furnace gas. The hot gases pass through a contact chamber in which they are oxidised by means of a catalyst composed of vanadium pentoxide, potassium oxide and precipitated silica. The gases containing H₂O and SO₃ are then cooled down to 280° C.–300° C. by indirect air cooling or by spraying in water, and thereupon pass from the bottom to the top of a condensation tower which is charged with fillers. The rate of flow therein amounts to 0.2 metre per second. This slow rate of flow presupposes a considerable diameter of the tower, which would have the effect of interfering with the dissipation of the sensible heat of the gas and also of the heat of condensation, from the interior to the exterior. The tower is therefore irrigated with 90% sulphuric acid which has the function of effecting a uniform dissipation of the heat. The quantity of acid thus added is small, it is approximately equal to the quantity of acid produced. Concentrated sulphuric acid having a 90% concentration is drawn off at the outlet of the tower. The outlet temperature of the gases at the upper end of the tower amounts to 140° C. and H₂SO₄ or SO₃ mist can no longer be detected in the waste gases. The total yield of sulphuric acid amounts to about 96% calculated on the sulphur charged in.

Example 3

Waste gases from a Dwight-Lloyd apparatus containing about 4 to 5% by volume of SO₂ and 15% by volume of water vapour are freed mechanically from dust and are thereupon brought to a temperature of 450° C. in a heat exchanger. The gases pass at this temperature into a contact chamber in which the SO₂ is oxidised to SO₃ on a catalyst of the nature described in Example 1. The gases leave the contact apparatus at a temperature of 420° C. and thereupon give up their heat in the heat exchanger to the fresh gases, being themselves cooled down to about 320° C. They thereupon pass into a condensing column at the lower end of which concentrated sulphuric acit containing 90 to 93% H₂SO₄ is drawn off whilst the waste gases containing steam issue from the top at a temperature of 140° C. The condensation is not effected in one tower but in a plurality of towers, in order in this manner to produce a larger superficial cooling area. The total yield of concentrated sulphuric acid calculated on the sulphur charged in amounts to 97%.

Example 4

Converter waste gases containing about 2% by volume of SO₂ are washed at 20° C. with water. The gases thus freed from dust contain about 2 to 3% by volume of water vapour. The cool gases are brought to a temperature of 420° C. in a heat exchanger and then pass into a contact apparatus in which SO₂ is oxidised to SO₃ in the catalyst hereinbefore described consisting of vanadium oxide, precipitated silica and an alkali metal oxide. The issuing hot gases then pass down from the top of the heat exchanger and give up their heat to the fresh gases. Since the gas only contained 2% by volume of SO₂ the cooling in the heat exchanger proceeds down to about 200° C. to 150° C. Sulphuric acid condenses out meanwhile in the heat exchanger tubes provided with fillers, and passes downwardly with the gases and is drawn off at the bottom end in the form of 95% sulphuric acid. The waste gases pass at a temperature of 150° C. to 200° C. to a small column provided with fillers, in which the remainder of the sulphuric acid is condensed, which is then united with the main condensate. The yield amounts to 97% calculated on the sulphur charged in.

Example 5

Gases from a Dwight-Lloyd apparatus containing about 2% by volume of SO₂ and a sufficient quantity of oxygen are washed with water at 50° C. to 60° C. and then contain about 12 to 20% by volume of water vapour. The gases then pass through a heat exchanger in which they are brought to the temperature necessary for catalysis. The SO₂ is thereupon oxidized in a contact chamber filled with catalyst consising of potassium oxide, vanadium oxide and silica; the hot waste gases are subsequently cooled in a heat exchanger, the sulphuric acid being condensed at the same time. The temperature at which the hot gases enter the heat exchanger amounts to 400° C. This heat exchanger is constructed in the form of two vertical towers, the hot gases entering the top of the first tower at 400° C. and leaving the bottom at a temperature of about 250° C., whilst in the second portion the gases pass upward from the bottom and leave the top at a temperature of about 150° C. The sulphuric acid condensing in both portions is drawn off at the bottom with a concentration of about 92% H₂SO₄. The heat exchanger tubes are provided with fillers so that the acid condensing and running down may improve the condensation of the sulphuric acid vapour by virtue of its contact with the gases passing therethrough. The rate of flow in the heat exchanger tubes amounts to 1.2 metres per second. The ratio of the cross-section to the length of the heat exchanger is preferably so arranged that the time for cooling from 280° C. to 150° C. is longer than 0.6 second. The quantity of acid condensed amounts to more than 99.9% of the total amount of acid formed, whilst the entire yield is 94.5%.

The invention may be very suitably applied to the treatment of gases containing sulphuretted hydrogen for the production of sulphuric acid. By combustion into SO₂, sulphuretted hydrogen, in particular, also furnishes sufficient water vapour for the formation of sulphuric acid. However, all previous proposals for working up sulphuretted hydrogen to sulphuric acid have been based on the express condition that the gases must be completely dried after combustion and prior to catalysis. Even with the employment of catalysts less sensitive to water than platinum, the opinion was held that such a high water content as that arising in the combustion of sulphuretted hydrogen was not permissible for carrying out the catalysis.

On the other hand, however, the employment of gases containing sulphuretted hydrogen introduces a considerable simplification in the process for the production of sulphuric acid. In the first place, no preliminary purification is needed, since the gases employed are free from solid dust particles and since, according to the present invention, the removal of water vapour is unnecessary. However, the combustion of sulphuretted hydrogen according to the equation:

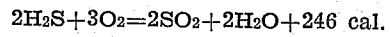

$$2H_2S + 3O_2 = 2SO_2 + 2H_2O + 246 \text{ cal.}$$

sets free such an amount of heat that the temperature of the gases of combustion far exceeds that necessary for the contact process. Consequently, no heat exchanger is required, but on the contrary, the heat disengaged in the combustion can be utilised for other purposes, the gases being at the same time cooled down to the optimum temperature for the catalysis. According to the content of sulphur dioxide and the velocity at which the gases enter the contact apparatus, this temperature lies between 350° C. and 450° C. Beyond the contact apparatus, the condensation is effected in the manner already described. At this stage also, cooling alone is necessary on occasion, and is effected either directly, by the admission of air, by injecting water (see Example 2), or by irrigating the condensing tower with sulphuric acid, or by indirect means.

Since an excess of water is desirable for the condensation, such gases, containing sulphuretted hydrogen, as already exhibit a certain humidity prior to combustion, are particularly suitable.

Figure 2:
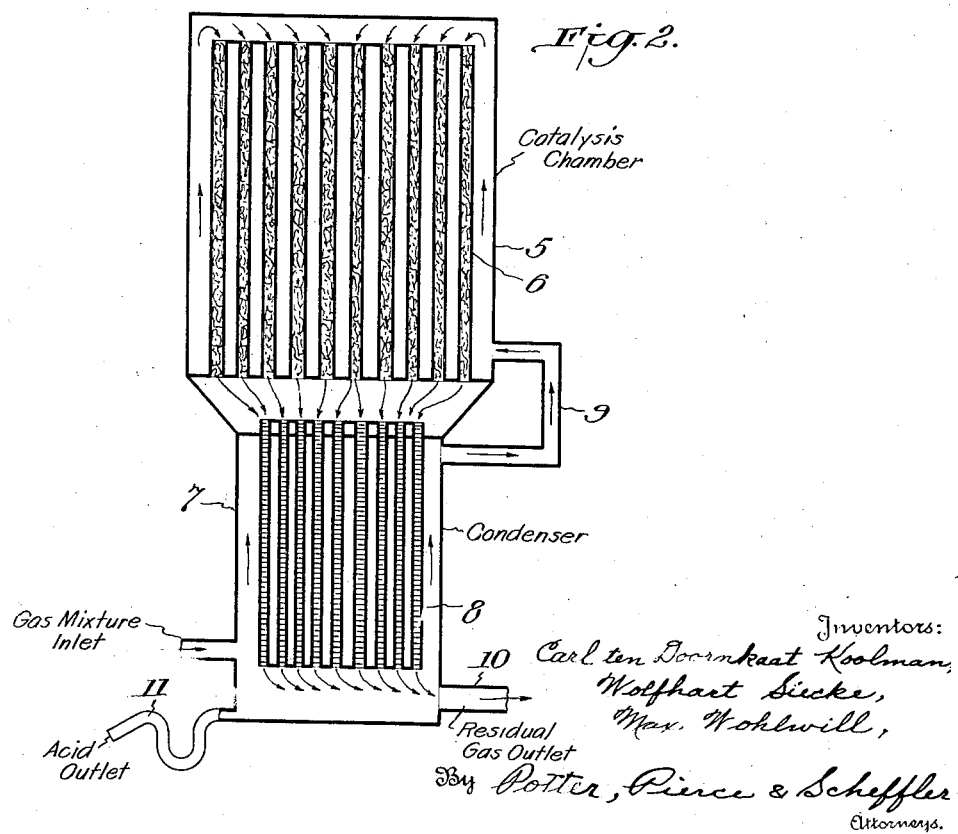

Examples of the manner in which the process may be carried out are illustrated in the accompanying drawing in which Fig. 1 is a schematic representation of the complete process and Fig. 2 diagrammatically illustrates an apparatus arrangement adapted for utilizing the heat of hydration and condensation.

In the embodiment according to Fig. 1, the sulphuretted hydrogen gas—obtained, for example, as exhaust gas in the "Le Petit" process (described in the work "Von den Kohlen und Mineral ölen", vol. II, 1929, pages 41–57, especially pages 52–56, Verlay Chemie, Berlin), and the like—is burned in a burner 1 with such an excess of air that enough oxygen (and more) is present for the formation of $SO_3$. The gas is then passed into an ordinary atmospheric condenser 2, where it is cooled to the optimum temperature of admission to the contact apparatus—estimated at 350° C.–450° C. according to the $SO_2$ content. The gas is then oxidised to $SO_3$, by the surplus oxygen present, in the contact apparatus 3, which is of known construction and is filled with a catalyst insensitive to water, such as a vanadium-oxide -alkali oxide-silica catalyst. In this operation, the oxidation sets up a temperature of about 500° C. in the contact furnace. The gas then passes from the contact apparatus into the condenser apparatus 4, of the dephlegmator type, where it is cooled down to below 330° C. and thereupon deposits sulphuric acid of any desired concentration, according to the condensation temperature.

The combustion is preferably performed by compressing the sulphuretted hydrogen and the air of combustion prior to entering the burner in order to obtain the positive pressure required for traversing the entire apparatus.

It has also been ascertained that sulphuretted hydrogen can be catalytically burned to $H_2O$ and $SO_2$ at extraordinarily low temperatures. Consequently, there is no need to burn the sulphuretted hydrogen with an open flame, but it can be oxidised catalytically, by employing a contact filter in place of the burner. The apparatus needed for this purpose can be operated independently or also in conjunction with the contact furnace. In the special embodiment according to Fig. 2, 5 is the contact chamber and 7 is the condenser chamber. The path of the gases is indicated by arrows. They enter the condenser chamber 7 at the bottom and flow around the actual condenser tubes 8 therein. The $H_2SO_4$ condensing in tubes 8 gives off heat to the walls of the tubes and from the latter to the gases which in their turn cool the walls of the tubes. These gases then flow through the connection 9 into the contact chamber 5 through which pipes 6 are conducted. The contact material is arranged in the pipes 6. In ascending through chamber 5, the gases flow around the pipes 6, cooling the latter and themselves being heated. They then pass into the actual pipes 6 from above and descend through the apparatus first through the contact tubes 6 and thence through the condenser tubes 8. At the bottom of the condenser the gases freed from $SO_2$ or $SO_3$ and consisting chiefly of oxygen and nitrogen, and possible $CO_2$ likewise, leave the condenser through the residual gas outlet 10 while the condensed sulphuric acid dripping down is drawn off from the lower part of the condenser through the acid outlet 11.

The process is particularly adapted for working up the $H_2S$ present in association with ammonia in coke-oven gas, the following interesting circulation process being adopted. The sulphuretted hydrogen is washed out of the coke-oven gas by one of the known processes, such as the "Le Petit" or Girdler process (described in the article by Bottoms "Organic Bases for Gas Purification" in Industrial and Engineering Chemistry, vol. 23, 1931, page 501, and in U. S. Patent No. 1,783,901), and is expelled as $H_2S$ from the absorption liquors. This is $H_2S$ is worked up to sulphuric acid in the manner described above, and this acid is employed for washing the ammonia out of the desulphurised coke-oven gas, thereby recovering ammonium sulphate direct, in the usual manner. Thus, in combination with this process, the sulphur and ammonia in the coke-oven gas are utilised without extraneous additions and without waste products.

The combination of both processes becomes particularly advantageous if the surplus heat obtained in the combustion of sulphuretted hydrogen and subsequent production of sulphuric acid be employed, for example, to expel the $H_2S$ from the wash liquors of the coke-oven gas. This surplus heat is generated at two points, firstly in the cooling apparatus directly succeeding the combustion of the gas, and secondly during the hydration of the acid subsequent to the contact apparatus. The effluent gases from ammonia saturators can also be utilised for the production of sulphuric acid in accordance with the invention.

The amounts of $H_2S$ generally occurring in ammonia saturators are insufficient to justify the erection of extensive apparatus. For example, a coke-oven gas may contain about 7 to 8 grammes of sulphur per cubic metre, so that, with a gas production of even 100,000 cubic metres per diem, the total amount of sulphur therein would be only 700 to 800 kgs. Even if it were possible to recover the whole of this sulphur, as $H_2S$, in the ammonia saturator, the resulting yield of sulphuric acid would be only about 2 to 2.5 tons. The apparatus for this quantity would have to be of a very simple kind to afford any prospect of advantageous utilising such effluent gases in practice, and this requirement is actually fulfilled by the hereinbefore described process.

*Example 6*

The affluent gases from an ammonia saturator and containing 20% of sulphuretted hydrogen and about 80% of $CO_2$ (traces of HCN, HCNS and other organic compounds being present) are mixed with air and burned in a suitable burner, under such conditions that the gases from the burner contain about 4–5% of $SO_2$ and 10% of oxygen. The gas temperature is 600° C., and cooling water is injected until the gas contains at least twice as much water as is sufficient for the complete formation of sulphuric acid. The surplus heat disengaged during the cooling of the gases to the suitable temperature (400–500° C.) for catalysis, is dissipated in an atmospheric cooler, after traversing which the gases are oxidised in a contact apparatus which contains a catalyst of about the following composition 6.5% vanadium oxid, 90.8 silica and 3.1% potassium oxid, followed by cooling, the resulting sulphuric acid being separated in a column apparatus. The conditions with regard to cooling and condensing are the same as in the treatment of hot roasting-furnace gases as set forth in Example 2.

The acid is drawn off at the gas intake of the column as in Example 2.

We claim:

1. A process for the production of sulphuric acid which comprises contacting gases containing sulphur dioxide in association with gases containing oxygen and at least sufficient water vapor for the formation of concentrated sulphuric acid with a catalyst comprising vanadium oxid and thereupon condensing the resulting gases within a temperature range from the dew point of the gases to about 140° C., the catalysis and condensation being carried out under superatmospheric pressure.

2. Process for the manufacture of high percentage sulphuric acid, which comprises contacting with a catalyst comprising vanadium oxide gases containing sulphur dioxide and oxygen together with water vapor in quantity materially in excess of that required to combine with the sulphur trioxide equivalent of the sulphur dioxide to form sulphuric acid monohydrate; withdrawing the gas mixture, comprising sulphur trioxide and water vapor, from contact with the catalyst while at a temperature above the dew point of the mixture; fractionally condensing liquid sulphuric acid of a percentage strength higher than corresponds to the amount of water present from the mixture of gases by cooling the latter through the temperature range between the dew point of the mixture and about 140° C. while so obstructing free flow of the gases as to maintain a high degree of turbulence in the gas mixture whereby substantial uniformity in temperature is maintained, excess water vapor remaining in the vapor phase in the uncondensed residue of the mixture; and withdrawing the uncondensed residue from the condenser at a temperature between 140° C. and the boiling point of water.

3. Process for the manufacture of high percentage sulphuric acid, which comprises contacting with a catalyst comprising vanadium oxide gases containing sulphur dioxide and oxygen together with water vapor in quantity at least 60% in excess of that required to combine with the sulphur trioxide equivalent of the sulphur dioxide to form sulphuric acid monohydrate; withdrawing the gas mixture, comprising sulphur trioxide and water vapor, from contact with the catalyst while at a temperature above the dew point of the mixture; fractionally condensing liquid sulphuric acid, of a percentage strength higher than corresponds to the amount of water present, from the mixture of gases by cooling the latter through the temperature range between the dew point of the mixture and about 140° C. while so obstructing free flow of the gases as to maintain a high degree of turbulence in the gas mixture, whereby substantial uniformity in temperature is maintained, excess water vapor remaining in the vapor phase in the uncondensed residue of the mixture; and withdrawing the uncondensed residue from the condenser at a temperature bewteen 140° C. and the boiling point of water.

4. Process for the manufacture of high percentage sulphuric acid, which comprises contacting with a catalyst comprising vanadium oxide gases containing sulphur dioxide and oxygen together with water vapor in quantity materially in excess of that required to combine with the sulphur trioxide equivalent of the sulphur dioxide to form sulphuric acid monohydrate; withdrawing the gas mixture, comprising sulphur trioxide and water vapor, from contact with the catalyst while at a temperature above the dew point of the mixture; fractionally condensing liquid sulphuric acid of at least 90% strength from the mixture of gases within the temperature range between the dew point of the mixture and about 140° C., while so obstructing free flow of gas as to maintain a high degree of turbulence in the gas mixture by passing the mixture of gases through tubes of a heat exchanger and intermingling the gases in said tubes by passage thereof over filling bodies arranged within said tubes, whereby substantial uniformity in temperature is maintained and high percentage sulphuric acid is liquefied, excess water vapor being maintained in the vapor phase; and withdrawing uncondensed residue of the mixture from the heat exchanger tubes at a temperature between 140° C. and the boiling point of water.

CARL TEN DOORNKAAT KOOLMAN.
WOLFHART SIECKE.
MAX WOHLWILL.